(12) United States Patent
Bando

(10) Patent No.: US 7,931,003 B2
(45) Date of Patent: Apr. 26, 2011

(54) RECIPROCATING ENGINE

(75) Inventor: Shigeru Bando, Tokushima (JP)

(73) Assignee: Bando Kiko Co., Ltd., Tokushima-shi (JP)

( * ) Notice: Subject to any disclaimer, the term of this patent is extended or adjusted under 35 U.S.C. 154(b) by 818 days.

(21) Appl. No.: 11/918,878

(22) PCT Filed: Apr. 26, 2006

(86) PCT No.: PCT/JP2006/308783
§ 371 (c)(1),
(2), (4) Date: Oct. 19, 2007

(87) PCT Pub. No.: WO2006/118165
PCT Pub. Date: Nov. 9, 2006

(65) Prior Publication Data
US 2009/0071433 A1    Mar. 19, 2009

(30) Foreign Application Priority Data

Apr. 27, 2005    (WO) .................. PCT/JP2005/008077

(51) Int. Cl.
*F02F 3/00*    (2006.01)
(52) U.S. Cl. .................. 123/193.4; 123/193.6
(58) Field of Classification Search ............ 123/193.6, 123/193.4, 193.2, 193.1; 92/143, 181, 182, 92/185; 277/27
See application file for complete search history.

(56) References Cited

U.S. PATENT DOCUMENTS

| | | | |
|---|---|---|---|
| 5,265,565 A | * | 11/1993 | Bando ................ 123/193.4 |
| 7,464,683 B2 | * | 12/2008 | Bando ................ 123/193.6 |
| 2006/0070597 A1 | * | 4/2006 | Bando ................ 123/193.4 |

FOREIGN PATENT DOCUMENTS

| | | |
|---|---|---|
| JP | 04-091353 | 3/1992 |
| JP | 04-321757 | 11/1992 |
| JP | 4-347352 | 12/1992 |
| JP | 04-347352 | 12/1992 |
| JP | 04-362258 | 12/1992 |
| WO | WO 92/02722 | 2/1992 |
| WO | WO 2004/079177 A1 | 9/2004 |

OTHER PUBLICATIONS

International Search Report for PCT/JP2006/308783 mailed Aug. 15, 2006.

* cited by examiner

*Primary Examiner* — M. McMahon
(74) *Attorney, Agent, or Firm* — Nixon & Vanderhye P.C.

(57) ABSTRACT

A reciprocating engine 1 includes an annular top ring 5 serving as a first piston ring disposed adjacent to a top surface (head end surface) 4 of a piston 3 defining a combustion chamber 2; an annular second ring 6 serving as a second piston ring disposed with the top ring 5 interposed between the annular second ring 6 and the top surface 4; an annular gas chamber 7 defined by the top ring 5 and the second ring 6; and a plurality of communicating passages 8 for allowing the annular gas chamber 7 and the combustion chamber 2 to communicate with each other. The top ring 5 and the second ring 6 are respectively inclined with respect to an X direction in which the piston 3 reciprocates, so as to be located further away from each other on a thrust side 9 than on an anti-thrust side 10.

3 Claims, 2 Drawing Sheets

[Fig.1]
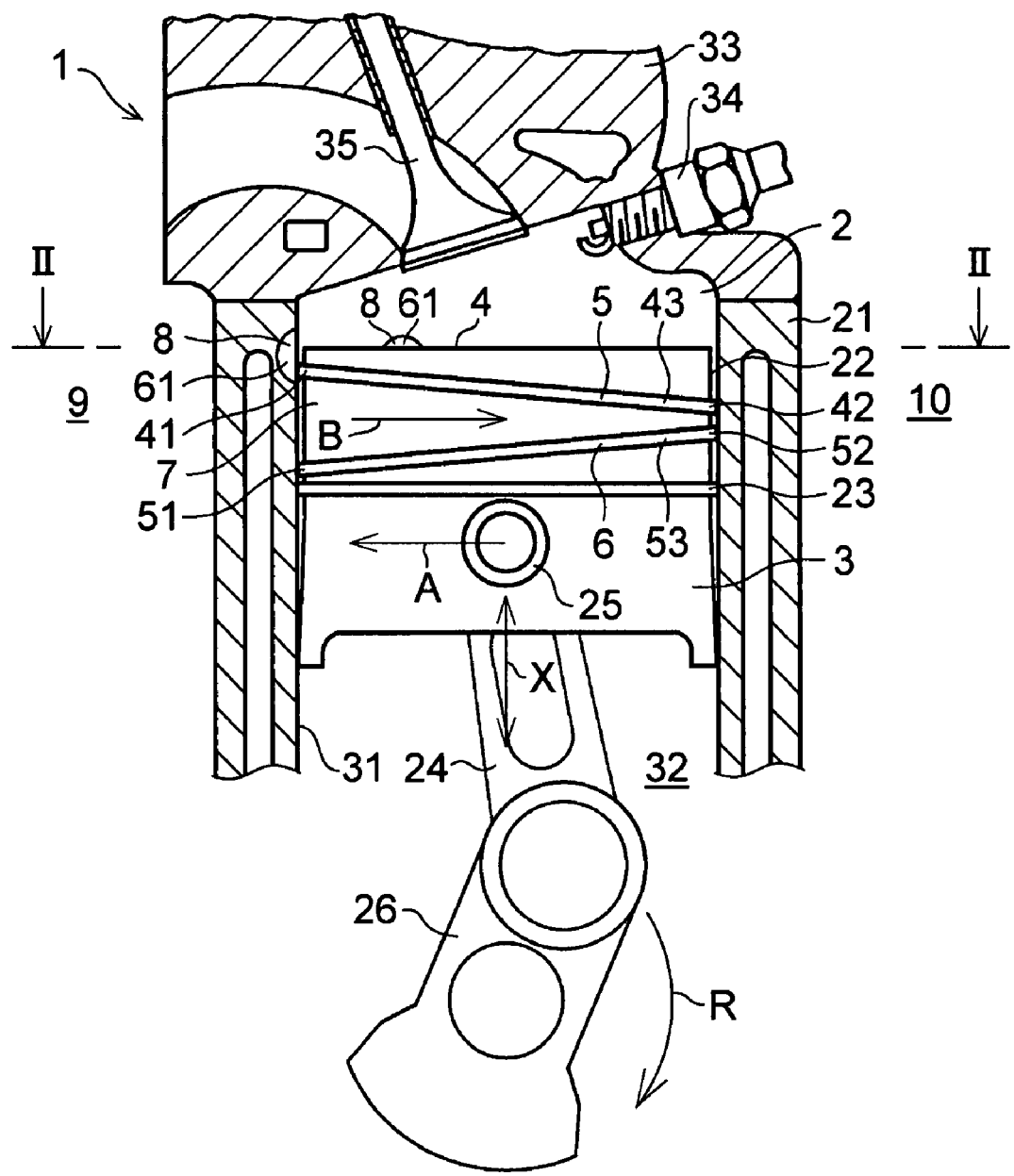

[Fig.2]
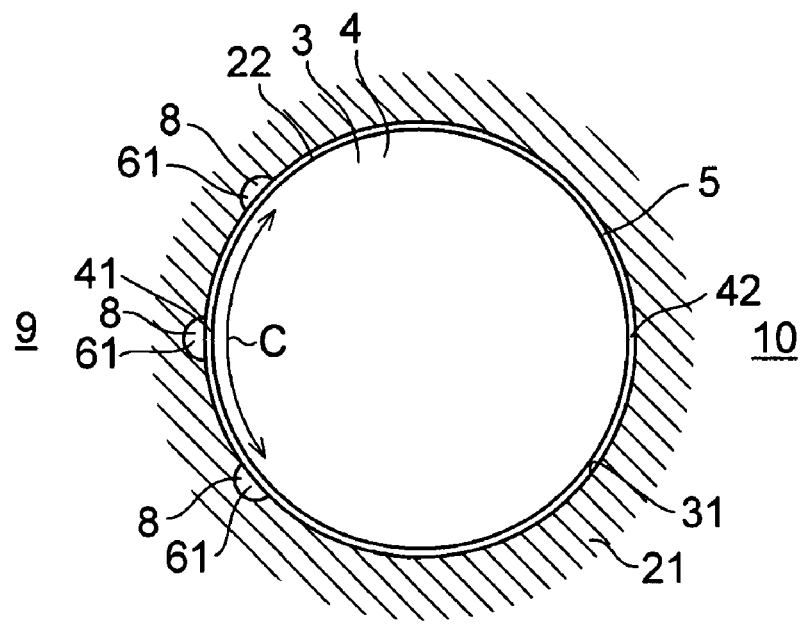
[Fig.3]
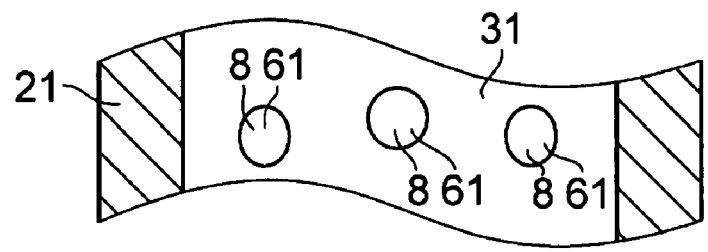

RECIPROCATING ENGINE

This application is the U.S. national phase of International Application No. PCT/JP2006/308783 filed 26 Apr. 2006 which designated the U.S. and claims priority to PCT/JP2005/008077 filed 27 Apr. 2005, the entire contents of each of which are hereby incorporated by reference.

TECHNICAL FIELD

The present invention relates to a reciprocating engine for use in an automobile, a marine vessel, an industrial prime mover, or the like.

BACKGROUND ART

Patent Document 1: JP-A-4-347352

For example, in patent document 1, a reciprocating engine is proposed in which a second piston ring (second ring) disposed with a first piston ring (top ring) interposed between the same and a top surface (head end surface) of a piston is inclined with respect to the reciprocating direction of the piston, such that a gas-pressure receiving area of the piston between the first piston ring and the second piston ring becomes greater on a thrust side than on an anti-thrust side, and gases from a combustion chamber are adapted to be introduced into an annular gas chamber between the first piston ring and the second piston ring. In such a reciprocating engine, larger gas pressure is produced on the thrust side than on the anti-thrust side so as to gas float the piston with respect to the cylinder.

DISCLOSURE OF THE INVENTION

Problems that the Invention is to Solve

Incidentally, in the above-described reciprocating engine, the gas-pressure receiving area of the piston between the first piston ring and the second piston ring is made greater on the thrust side than on the anti-thrust side by inclining only the second piston ring, so that the angle of inclination of the second piston ring becomes large, and the second piston ring becomes remarkably elliptical in shape. As a result, there are possibilities that it becomes impossible to ensure the gastightness between the outer peripheral surface of the piston ring and the inner peripheral surface of the cylinder, that the second piston ring becomes difficult to rotate relative to the piston, and that damage or the like is likely to be caused to the second piston ring and the inner peripheral surface of the cylinder which is in sliding contact with that second piston ring. In addition, the fabrication of the piston ring which is remarkably elliptical in shape is also difficult.

The present invention has been devised in view of the above-described aspects, and its object is to provide a reciprocating engine which makes it possible to gas float the piston with respect to the cylinder, reduce the angle of inclination of each of the first and second piston rings, and form the annular gas chamber for effectively producing a floating force for gas floating, and in which circular piston rings can be used, the gastightness between the inner peripheral surface of the cylinder and the outer peripheral surfaces of the piston rings can be ensured, and damage or the like is difficult to cause to the piston rings and the inner peripheral surface of the cylinder.

Means for Solving the Problems

A reciprocating engine in accordance with the invention comprises: a first piston ring disposed adjacent to a top surface of a piston defining a combustion chamber; a second piston ring disposed with the first piston ring interposed between the second piston ring and the top surface of the piston; an annular gas chamber defined by the first piston ring and the second piston ring; and one or a plurality of communicating passages for allowing the annular gas chamber and the combustion chamber to communicate with each other, wherein the first piston ring and the second piston ring are respectively inclined with respect to a reciprocating direction of the piston so as to be located further away from each other on a thrust side than on a anti-thrust side.

According to the reciprocating engine in accordance with the invention, one or a plurality of communicating passages are provided for allowing the annular gas chamber and the combustion chamber to communicate with each other, and the first piston ring and the second piston ring are respectively inclined with respect to the reciprocating direction of the piston so as to be located further away from each other on the thrust side than on the anti-thrust side. Therefore, a larger gas pressure can be produced in the annular gas chamber on the thrust side than on the anti-thrust side, thereby making it possible to gas float the piston with respect to the cylinder and reducing the angle of inclination of each of the first piston ring and the second piston ring. Hence, it is possible to form the annular gas chamber for effectively producing a floating force for gas floating. Further, conventional circular piston rings can be used as the first piston ring and the second piston ring, and the first piston ring and the second piston ring can be set in a state of being easily rotatable with respect to the piston and the cylinder. Furthermore, the gastightness between the inner peripheral surface of the cylinder and the outer peripheral surfaces of the piston rings can be ensured, and damage or the like is made difficult to cause to the piston rings and the inner peripheral surface of the cylinder.

In a preferred example of the reciprocating engine in accordance with the invention, the first piston ring and the second piston ring are located closer to each other on the anti-thrust side.

In another preferred example of the reciprocating engine in accordance with the invention, the communicating passage is disposed on the thrust side so as to allow the annular gas chamber and the combustion chamber to communicate with each other when the piston is positioned at a top dead center or in a vicinity of the top dead center.

ADVANTAGES OF THE INVENTION

According to the invention, it is possible to provide a reciprocating engine which makes it possible to gas float the piston with respect to the cylinder, reduce the angle of inclination of each of the first and second piston rings, and form the annular gas chamber for effectively producing a floating force for gas floating, and in which circular piston rings can be used, the gastightness between the inner peripheral surface of the cylinder and the outer peripheral surfaces of the piston rings can be ensured, and damage or the like is difficult to cause to the piston rings and the inner peripheral surface of the cylinder.

BEST MODE FOR CARRYING OUT THE INVENTION

Next, a more detailed description will be given of an embodiment of the invention with reference to the embodiment shown in the drawings. It should be noted that the invention is not limited to the embodiment.

In FIGS. 1 to 3, a reciprocating engine 1 in accordance with this embodiment is comprised of an annular top ring 5 serving as a first piston ring disposed adjacent to a top surface (head end surface) 4 of a piston 3 defining a combustion chamber 2; an annular second ring 6 serving as a second piston ring disposed with the top ring 5 interposed between the annular second ring 6 and the top surface 4; an annular gas chamber 7 defined by the top ring 5 and the second ring 6; and a plurality of communicating passages 8 for allowing the annular gas chamber 7 and the combustion chamber 2 to communicate with each other.

The reciprocating engine 1 may be a two-cycle or four-cycle gasoline engine or may be a diesel engine.

Piston ring grooves, in which the top ring 5 and the second ring 6 are respectively fitted and secured, are provided on a circumferential surface 22 connected to the top surface 4 of the piston 3 which reciprocates in a cylinder 21 in an X direction. In addition, an oil ring groove, in which an oil ring 23 disposed with the second ring 6 interposed between the same and the top ring 5 is fitted and secured, is also provided on the circumferential surface 22. The top surface 4 is parallel to a plane perpendicular to the X direction. The piston 3 is connected to one end of a connecting rod 24 by means of a piston pin 25. A crankshaft 26 is connected to the other end of the connecting rod 24.

An inner peripheral surface 31 of the cylinder 21 defines a cylinder bore (space) 32 where the piston 3 is disposed. An ignition plug 34, an intake valve 35, and an exhaust valve (not shown) are provided in a head portion 33 of the cylinder 21.

A portion 41 on a thrust side 9 of the top ring 5 is disposed in closer proximity to the top surface 4 in the X direction than a portion 42 on an anti-thrust side 10 of the top ring 5. The portion 41 is located further away from the second ring 6 in the X direction than the portion 42. An outer peripheral surface 43 of the top ring 5 is in slidable contact with the inner peripheral surface 31 of the cylinder 21. The top ring 5 defines the combustion chamber 2 in cooperation with the cylinder 21 and the piston 3 and defines the annular gas chamber 7 in cooperation with the cylinder 21, the piston 3 and the second ring 6. Such a top ring 5 is inclined with respect to the X direction in which the piston 3 reciprocates, so as to be located further away from the second ring 6 on the thrust side 9 than on the anti-thrust side 10. The top ring 5 is also inclined with respect to the plane perpendicular to the X direction, and an angle of such inclination is preferably 1 degree to 3 degrees, more preferably 2 degrees to 3 degrees, and even more preferably 2.3 degrees or thereabouts. The top ring 5 is fitted and secured in the piston ring groove (top ring groove) of the piston 3 with a slight gap so as to assume such a state as to be capable of rotating with respect to the piston 3 in a C direction shown in FIG. 2, i.e., the circumferential direction of the piston 3, and to be movable in a radial direction.

A portion 51 on the thrust side 9 of the second ring 6 is disposed further away from the top surface 4 in the X direction than a portion 52 on the anti-thrust side 10 of the second ring 6. The portion 51 is disposed further away from the top ring 5 in the X direction than the portion 52. The distance from the portion 41 to the portion 51 in the X direction is longer than the distance between the portion 42 to the portion 52 in the X direction. An outer peripheral surface 53 of the second ring 6 is in slidable contact with the inner peripheral surface 31 of the cylinder 21. The second ring 6 defines the annular gas chamber 7 in cooperation with the cylinder 21, the piston 3, and the top ring 5. Such a second ring 6 is inclined with respect to the X direction in which the piston 3 reciprocates, so as to be located further away from the top ring 5 on the thrust side 9 than on the anti-thrust side 10. The second ring 6 is also inclined in an opposite direction to the top ring 5 with respect to the plane perpendicular to the X direction, and an angle of such inclination is preferably 1 degree to 3 degrees, more preferably 2 degrees to 3 degrees, and even more preferably 2.3 degrees or thereabouts. The second ring 6 is inclined in the opposite direction to the inclination of the top ring 5, as shown in FIG. 1. The second ring 6 is fitted and secured in the piston ring groove (second ring groove) of the piston 3 with a slight gap so as to assume such a state as to be capable of rotating with respect to the piston 3 in the C direction and to be movable in the radial direction. The respective angles of inclination of the top ring 5 and the second ring 6 with respect to the plane perpendicular to the X direction may be mutually identical angles. The top ring 5 and the second ring 6 may be symmetrical.

The top ring 5 and the second ring 6 are located further away from each other in the X direction on the thrust side 9 than on the anti-thrust side 10 and are located closer to each other on the anti-thrust side 10 than on the thrust side 9. The gas-pressure receiving area of the circumferential surface 22 between the top ring 5 and the second ring 6 is greater on the thrust side 9 than on the anti-thrust side 10, and gradually increases from the anti-thrust side 10 toward the thrust side 9.

As shown in FIGS. 2 and 3, in this embodiment three communicating passages 8 are respectively disposed on the thrust side 9 to allow the annular gas chamber 7 and the combustion chamber 2 to communicate with each other when the piston 3 is positioned at the top dead center or in the vicinity of the top dead center. Each of the communicating passages 8 has a recess 61 provided on the inner peripheral surface 31 of the cylinder 21.

The recesses 61 in this embodiment are respectively arranged on the inner peripheral surface 31 of the cylinder 21, as shown in FIG. 3, so as to mutually simultaneously allow the annular gas chamber 7 to communicate with the combustion chamber 2 in a case where the piston 3 dwells at a position corresponding to between substantially 0 to 5 degrees and 20 to 30 degrees in the crank angle with respect to the X direction in the explosion stroke. It should be noted that the aforementioned crank angle for communication is determined by the piston diameter and the stroke. The three recesses 61 are respectively arranged at mutually equal intervals in the C direction. The recess 61 located on one side in the direction in which the piston pin 25 extends and the recess 61 located on the other side are opposed to each other in the direction in which the piston pin 25 extends, and the recess 61 located between these two recesses 61 is disposed so as to allow the combustion chamber 2 to communicate with the annular gas chamber 7 through the portion 41 of the top ring 5.

It should be noted that the recess 61 on the one side and the recess 61 on the other side may be arranged in the X direction so as to mutually simultaneously allow the combustion chamber 2 to communicate with the annular gas chamber 7 before or after the communication between the combustion chamber 2 and the annular gas chamber 7 through the recess 61 located between the two recesses 61. In addition, the recess 61 located between the recess 61 on the one side and the recess 61 on the other side may be omitted. Furthermore, although in this embodiment only one recess 61 is disposed on each of one side and the other side of the portion 41 of the top ring 5 in the direction in which the piston pin 25 extends, for example, two or more recesses 61 may be disposed on the one side, and the recesses 61 in a number identical to that of the recesses 61 on the one side may be disposed on the other side.

It should be noted that although in this embodiment the reciprocating engine 1 has the plurality of communicating passages 8, the reciprocating engine 1 may have only one communicating passage 8, for example.

Hereafter, a detailed description will be given of the operation of the reciprocating engine 1 in accordance with this embodiment.

In the explosion stroke shown in FIG. 1, when the piston 3 starts forward motion toward the crankshaft 26 side in the X direction, combustion gases in the combustion chamber 2 are introduced into the annular gas chamber 7 through the communicating passages 8, and the gas pressure in the annular gas chamber 7 is increased by the gas pressure of the introduced combustion gases. A lateral pressure A directed toward the thrust side 9 is imparted to the piston 3 which is forwardly moved, in the light of such as relationships among the gas pressure to which the piston 3 is subjected between the top surface 4 and the top ring 5, the rotation of the crankshaft 26 in an R direction, and the inclination of the connecting rod 24, whereas, against such a lateral pressure A, a lateral pressure B is also imparted thereto which is directed toward the anti-thrust side 10 on the basis of the gas pressure in the annular gas chamber 7 produced on a larger scale on the thrust side 9 than on the anti-thrust side 10. The piston 3 to which the lateral pressures A and B are thus imparted is gas floated with respect to the cylinder 21.

The reciprocating engine 1 in accordance with this embodiment is comprised of the top ring 5 disposed adjacent to the top surface 4 of the piston 3 defining the combustion chamber 2; the second ring 6 disposed with the top ring 5 interposed between the same and the top surface 4 of the piston 3; the annular gas chamber 7 defined by the top ring 5 and the second ring 6; and one or a plurality of communicating passages 8 for allowing the annular gas chamber 7 and the combustion chamber 2 to communicate with each other. Further, the top ring 5 and the second ring 6 are respectively inclined with respect to the X direction which is the reciprocating direction of the piston 3, so as to be located further away from each other on the thrust side 9 than on the anti-thrust side 10. Therefore, a larger gas pressure can be produced in the annular gas chamber 7 on the thrust side 9 than on the anti-thrust side 10, thereby making it possible to gas float the piston 3 with respect to the cylinder 21 and reduce the angle of inclination of each of the top ring 5 and the second ring 6. For this reason, it is possible to form the annular gas chamber 7 for effectively producing a floating force for gas floating. Further, the top ring 5 and the second ring 6 which are circular in shape can be used, and the top ring 5 and the second ring 6 are set in a state of being rotatable with respect to the inner peripheral surface 31 of the cylinder 21. Furthermore, the gastightness between, on the one hand, the inner peripheral surface 31 of the cylinder 21 and, on the other hand, the outer peripheral surface 43 of the top ring 5 and the outer peripheral surface 53 of the second ring 6 can be ensured, and damage or the like is made difficult to cause to the top ring 5, the second ring 6, and the inner peripheral surface 31 of the cylinder 21.

BRIEF DESCRIPTION OF THE DRAWINGS

FIG. 1 is an explanatory cross-sectional view of an embodiment of the invention;

FIG. 2 is an explanatory cross-sectional view, taken in the direction of arrows along line II-II, of the embodiment shown in FIG. 1; and FIG. 3 is an explanatory view of mainly communicating passages in the embodiment shown in FIG. 1.

DESCRIPTION OF REFERENCE NUMERALS AND SIGNS

1: reciprocating engine
2: combustion chamber
3: piston
4: top surface
5: top ring
6: second ring
7: annular gas chamber
8: communicating passage

The invention claimed is:

1. A reciprocating engine comprises: a first piston ring disposed adjacent to a top surface of a piston defining a combustion chamber; a second piston ring, said first piston ring being interposed between said second piston ring and the top surface of said piston; an annular gas chamber defined by said first piston ring and said second piston ring; and one or a plurality of communicating passages for allowing said annular gas chamber and said combustion chamber to communicate with each other, said first piston ring being inclined with respect to a reciprocating direction of said piston so as to dispose a portion on a thrust side of the first piston ring in closer proximity to the top surface of said piston in the reciprocating direction than a portion on an anti-thrust side of the first piston ring, said second piston ring being inclined in a direction which is opposite to an inclined direction of said first piston ring with respect to the reciprocating direction of said piston, wherein said first piston ring and said second piston ring are located further away from each other on the thrust side than on the anti-thrust side.

2. The reciprocating engine according to claim 1, wherein said first piston ring and said second piston ring are located closer to each other on the anti-thrust side.

3. The reciprocating engine according to claim 1, wherein said communicating passage is disposed on the thrust side so as to allow said annular gas chamber and said combustion chamber to communicate with each other when said piston is positioned at a top dead center or in a vicinity of the top dead center.

\* \* \* \* \*